Jan. 24, 1928.

R. B. WASSON 1,657,139

SCALE

Filed Nov. 20, 1925

INVENTOR
Robert B. Wasson
BY
Ramsay Hoguet.
ATTORNEY

Patented Jan. 24, 1928.

1,657,139

UNITED STATES PATENT OFFICE.

ROBERT B. WASSON, OF CRANFORD, NEW JERSEY.

SCALE.

Application filed November 20, 1925. Serial No. 70,426.

My invention relates to improvements in springless scales, and the object of my invention is to produce a scale of this character which can be used for measuring and indicating dead weights, or can be used to great advantage in measuring and indicating strain, such as torque, horse power, and the like, which is usually expressed in pounds. My invention is intended to produce a simple mechanism which can be easily built and assembled, and which while being adapted to weigh heavy objects or equivalent heavy strains, is still extremely sensitive and can be adjusted readily so as to afford a perfect balance. My invention employs a swinging pendulum normally hanging vertically, and the swinging of the pendulum because of strain acts to change its oscillations first to reciprocating motion and then to rotary motion which is imparted to the hand of the indicator; the mechanism is based on the principle that the effectiveness of a pendulum or weight having circular motion is directly proportional to length or magnitude of the base line corresponding to the angle through which the weight has moved.

Reference is to be had to the accompanying drawings forming a part of this specification, in which similar reference characters indicate corresponding parts in all the views.

Figure 1:
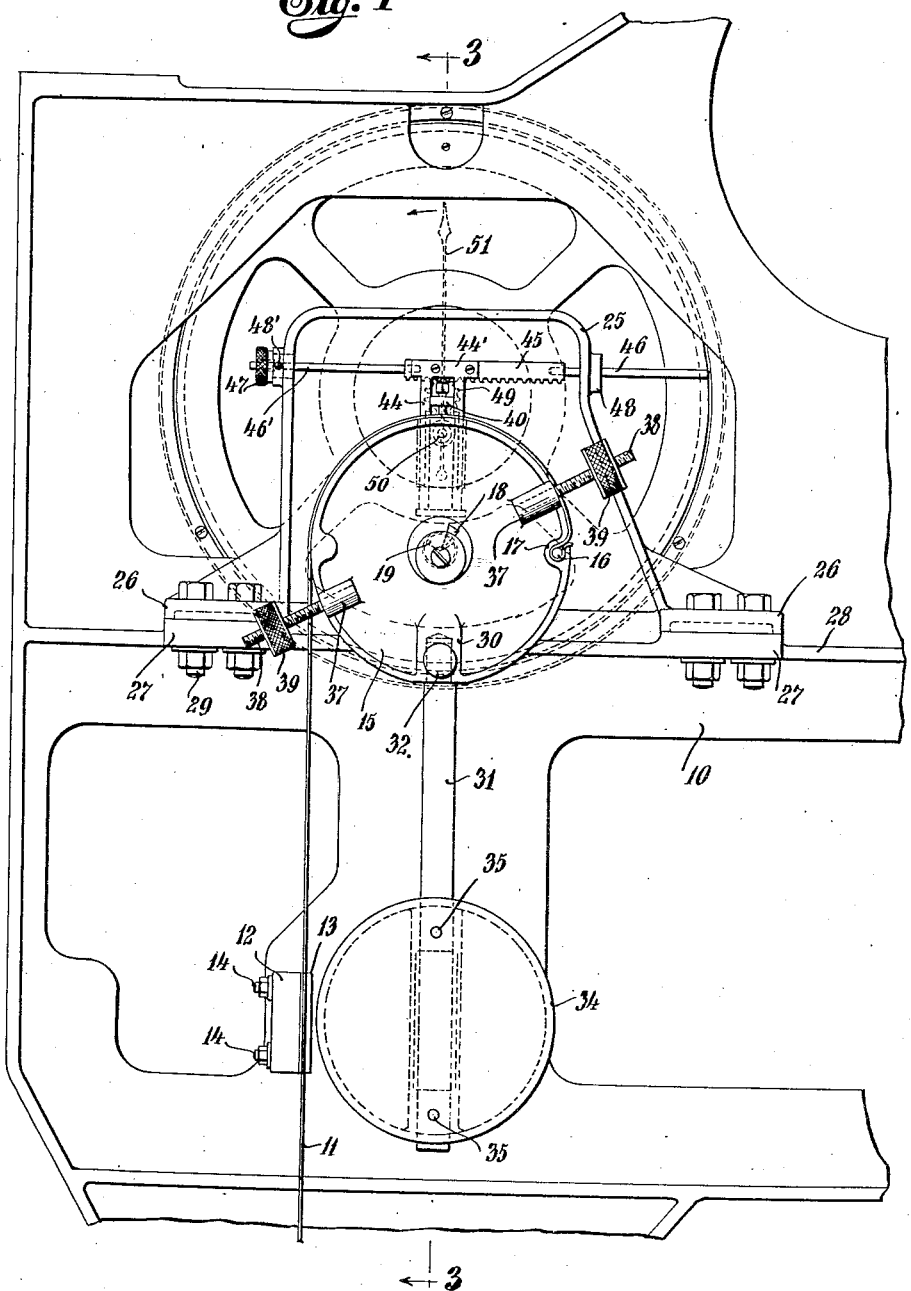
Figure 1 is an inside elevation of the mechanism embodying my improved scale showing the parts in normal position.

The machine has a suitable frame or casing 10 which is preferably an enclosing casing so that the parts can be protected against being tampered with, and the weight or strain to be measured is applied to a band 11 which enters the casing from the bottom and passes opposite a guide 12, and between the guide and a tension shoe 13 which may be of leather, and which is adjustable on the guide with relation to its pressure on the band 11 by bolts 14 which hold the shoe securely in place. The shoe 13 is arranged to contact with the band 11 in such a manner as to prevent slackness in said band, but it is to be understood that said shoe does not press against the band to such an extent as to interfere with the operation of the device or in such a manner as to cause error in the weight indication.

Figure 2:
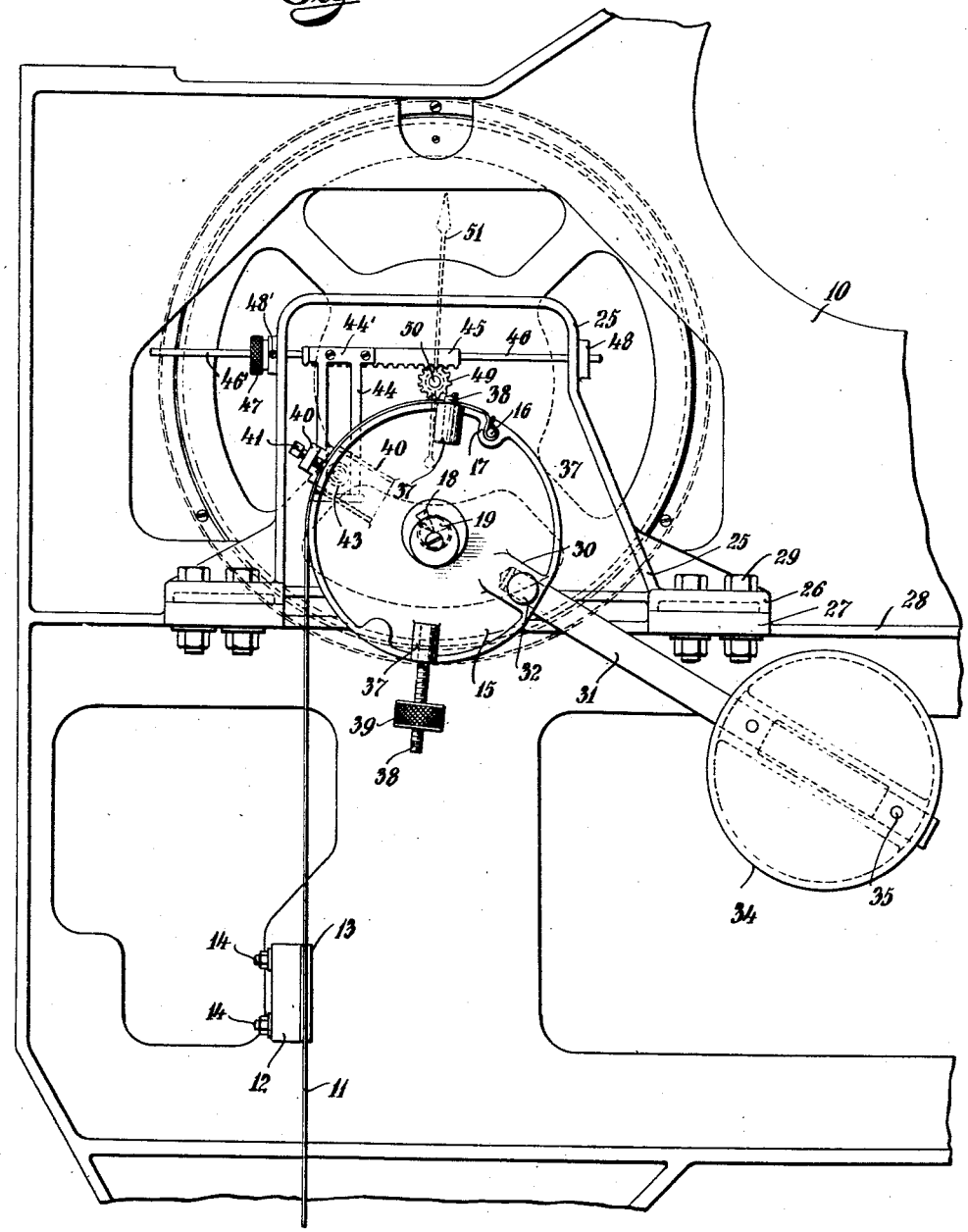
Figure 2 is a view similar to Figure 1 but with the parts in a different position.

The band 11 passes over at least a part of the face of a drum 15 and is tangentially attached thereto so that the weight or strain on the band will tend to turn the drum, and the band can be secured to the drum in any convenient way, a preferred way being shown in which a pin 16 is used to hold the band in a recess 17 in the face of the drum 15 as shown in Figures 1 and 2. Thus weight applied to the band 11 will tend to turn the drum.

In order that the drum may be very sensitive to movement, I prefer to give it a knife edge bearing, and to this end it has a knife 18, the edge of which enters a segmental recess 19 in the center pin 20 on which the drum turns.

Figure 3:
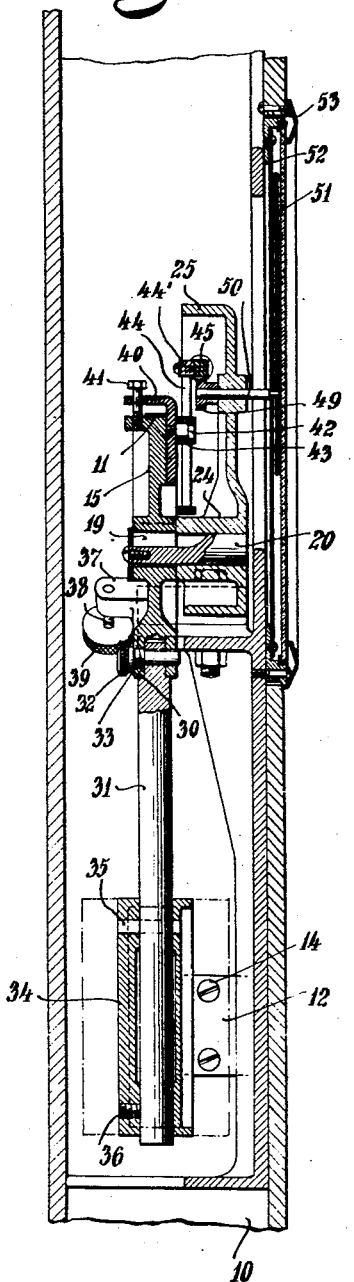
Figure 3 is a vertical section on the line 3—3 of Figure 1.
Figure 4:
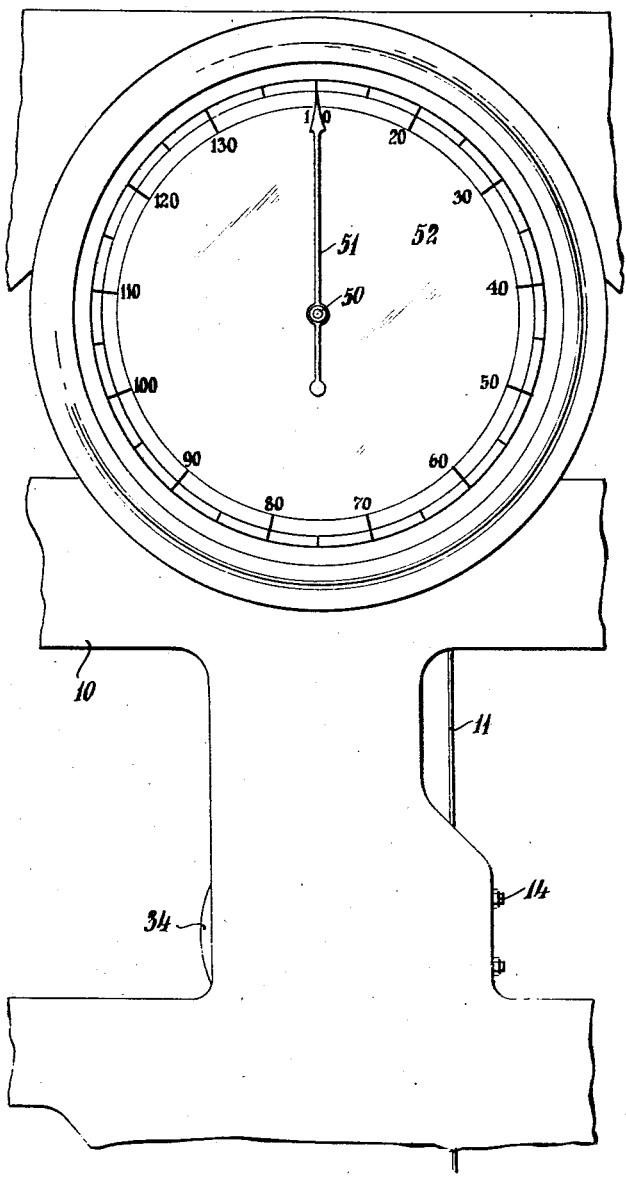
Figure 4 is a broken face view showing the dial.

The pin 20 is held in a journal 24 of the bracket 25 which has an overhanging edge and top flange as shown best in Figure 3, and which is preferably provided with base flanges 26 seating on flanges 27 of a horizontal rib or table 28 on the main frame or casing, and the bracket is held in place by bolts 29 passing through the flanges 26 and 27.

The drum is centered by a weight which can be attached in any suitable way, but I have shown a preferred means in which the lower periphery of the drum is provided with a socket 30 which receives the upper end of a weight arm 31 which can be screwed into the socket, and is also held against displacement by a pin 32 which passes through the walls of the socket and through the upper end of the arm 31 as in Figure 3, and also preferably screws for a short distance into one of the socket walls as shown at 33. The arm has at its lower end a weight 34 which is adjustable up and down on the arm, and which is provided with holes 35 to receive set screws 36 to fix its position on the arm. Thus the heavy weight 34 tends to hold the drum 15 and connected parts at normal or zero position, and when weight is applied to the band 11, it turns the drum against the inertia of the weight 34.

To provide for still nicer adjustment of the scale and for more perfect centering of the drum 15, I use counter weights on opposite sides of the vertical center of the drum, which are adjustable in and out, and by which the balance and calibration can be made perfect. To this end I preferably provide sockets 37 radially arranged on diametrically opposite sides of the drum (see Figures 1 and 2), and these are provided with screw rods 38 on which are nuts 39, milled to be easily turned and serving as counter weights, so that by adjusting these counter weights with relation to each other and to the weight 34, a perfect balance can be quickly made.

As the drum 15 has a knife edge bearing, it is not convenient to operate an indicator from the shaft, and I can do this more accurately and with less liability of disarrangement by taking the power from a point nearer the periphery of the drum. To this end I provide an L shaped slide 40 which is secured to the side of the drum near its periphery, and overlaps one face of the drum, being held in place by a screw 41, and by reference to Figure 3 it will be seen that this slide serves as a means of imparting movement to the indicator, and also as a guide for the band 11.

To the side of the slide is secured a stud 42 on which runs a roller 43, this moving in a slotted guide arm 44, the upper end 44' of which is rigidly secured to a horizontally moving toothed rack 45, this being carried by the guide rods 46 and 46' which move in bushings 48 and 47, the latter of which can be moved, and the position of the rods can be fixed by a set screw 48'.

The toothed rack 45 engages a pinion 49 on the shaft 50 which carries an indicating hand or pintle 51 movable over a dial 52 which is graduated to express pounds, and of course can be divided into any fractions thereof. I have shown the front of the dial having a suitable edge bezel 53.

From the foregoing description it will be seen that I have devised a very simple, practical, and efficient scale which avoids the use of springs, and which can be quickly adjusted to the utmost nicety of balance, and that while it can be used for weighing any weighable matter, it is particularly adapted for use in connection with machines or apparatus where strain representing torque, horse power, or other units of measurement is applied to the band 11, and the weight or strain expressed on an indicator.

I claim:—

1. A springless scale comprising a weight centered drum, a weight band tangentially extending from the drum, an indicator operated from the drum, and a tensioning guide for the band.

2. In a scale of the kind described, the weight centered drum, the weight band eccentrically connected to the drum, and a shoe frictionally engaging the band.

3. A scale comprising a weight centered drum, a weight band eccentrically connected to the drum, a guide having a shoe adjustably supported thereon to engage the band, and an indicator operated from the drum.

4. A scale comprising in combination, a drum, a weight secured thereto, a weight band extending tangentially from the drum, counterweights carried by and adjustable in and out on said drum, a frame, a rack slidable in said frame, means secured to said drum for sliding said rack, an indicator, and means operated by said rack for moving said indicator.

5. A scale comprising in combination, a drum, a weight secured thereto and adjustable with respect to the drum, a weight band extending tangentially from the drum, a frame, a rack supported by said frame and reciprocating therein, means for adjusting the position of the rack in the frame, means secured to the drum for reciprocating said rack, an indicator, and means operated by said rack for moving said indicator.

6. A scale comprising a weight centered drum, a weight band extending tangentially from the drum, a toothed rack sliding adjacent the drum, a pinion connecting the rack with the hand of an indicator, and a sliding connection between the drum and the rack by which the oscillation of the drum moves the rack.

7. In a scale the combination with the weight centered drum and the slide thereon, of a sliding rack having a pinion connection with the hand of an indicator, the slotted guide on the rack, and a member on the slide entering the slotted guide.

8. The combination with the weight centered drum, the indicator, and the rack and pinion for operating the indicator, of a weight band extending tangentially from the drum, the slide on the drum acting as a guide for the band, and a sliding connection between the aforesaid slide and the rack.

9. A beamless scale comprising a weight centered rotatable drum, counter weights adjustable in and out on diametrically opposite sides of the drum to regulate its balance, a strain transmitting member secured tangentially on the drum, and an indicator operated from the drum.

In testimony whereof, I have signed my name to this specification this 18th day of November, 1925.

ROBERT B. WASSON.